United States Patent [19]

Moldovan et al.

[11] 4,332,527
[45] Jun. 1, 1982

[54] VARIABLE SPEED CENTRIFUGAL PUMP

[75] Inventors: Richard J. Moldovan, Avon; Harold D. Davis, Ashland, both of Ohio

[73] Assignee: Lear Siegler, Inc., Elyria, Ohio

[21] Appl. No.: 65,527

[22] Filed: Aug. 10, 1979

[51] Int. Cl.³ .............................................. F04B 49/00
[52] U.S. Cl. ................................. 417/15; 415/122 R; 417/22; 417/87
[58] Field of Search ............... 415/18, 122 R; 417/15, 417/84, 85, 87, 89, 79, 80, 18, 20, 22, 24, 212, 213

[56] References Cited

U.S. PATENT DOCUMENTS

| | | | |
|---|---|---|---|
| 2,741,421 | 4/1956 | Wood | 415/18 X |
| 2,970,641 | 2/1961 | Rosen et al. | 60/39.28 R |
| 3,532,441 | 10/1970 | Schofield | 417/89 X |
| 3,547,557 | 12/1970 | Grennan et al. | 417/89 |
| 4,004,412 | 1/1977 | Burnell | 415/15 X |
| 4,086,019 | 4/1978 | Poole | 415/122 R X |
| 4,142,839 | 3/1979 | Davis et al. | 417/89 |

OTHER PUBLICATIONS

*Control of Aircraft and Missile Powerplants* by Sobey et al., John Wiley and Sons, Inc., Mar., 1963, pp. 32 and 33.

Primary Examiner—Carlton R. Croyle
Assistant Examiner—Edward Look
Attorney, Agent, or Firm—Maky, Renner, Otto & Boisselle

[57] ABSTRACT

A variable speed centrifugal pump for aircraft fuel systems and the like having the capability of matching fuel flow and pressure to engine requirements throughout a variable flight profile without in-line flow controls and metering devices comprising a unique combination of centrifugal impeller stage and positive displacement pump device which controllingly, drivingly, fluidly couples the impeller to the aircraft engine drive. The positive displacement pump device includes rotating hydraulic displacing input and output members, the latter being driven by the former at a relative speed normally responsive to discharge flow rate of the positive displacement pump device which is controlled to regulate impeller speed for matching pump flow and pressure to engine requirements. The positive displacement pump may employ fuel as the pumping media in which event the discharge flow from the positive displacement pump device may be directed to the main pump outlet during pump priming and engine start-up and, alternately, to a jet nozzle provided in series with the centrifugal impeller stage to provide motive flow therefor under idle and in-flight conditions. During engine prime and start-up, free rotation of the impeller may be restrained by a clutch responsive to impeller discharge pressure to ensure adequate fuel supply delivery by the positive displacement pump device to the engine at low RPM's. Alternatively, other hydraulic fluid may be used as the pumping media for the positive displacement pump, and an auxiliary start pump provided for use during pump prime and engine start-up.

24 Claims, 3 Drawing Figures

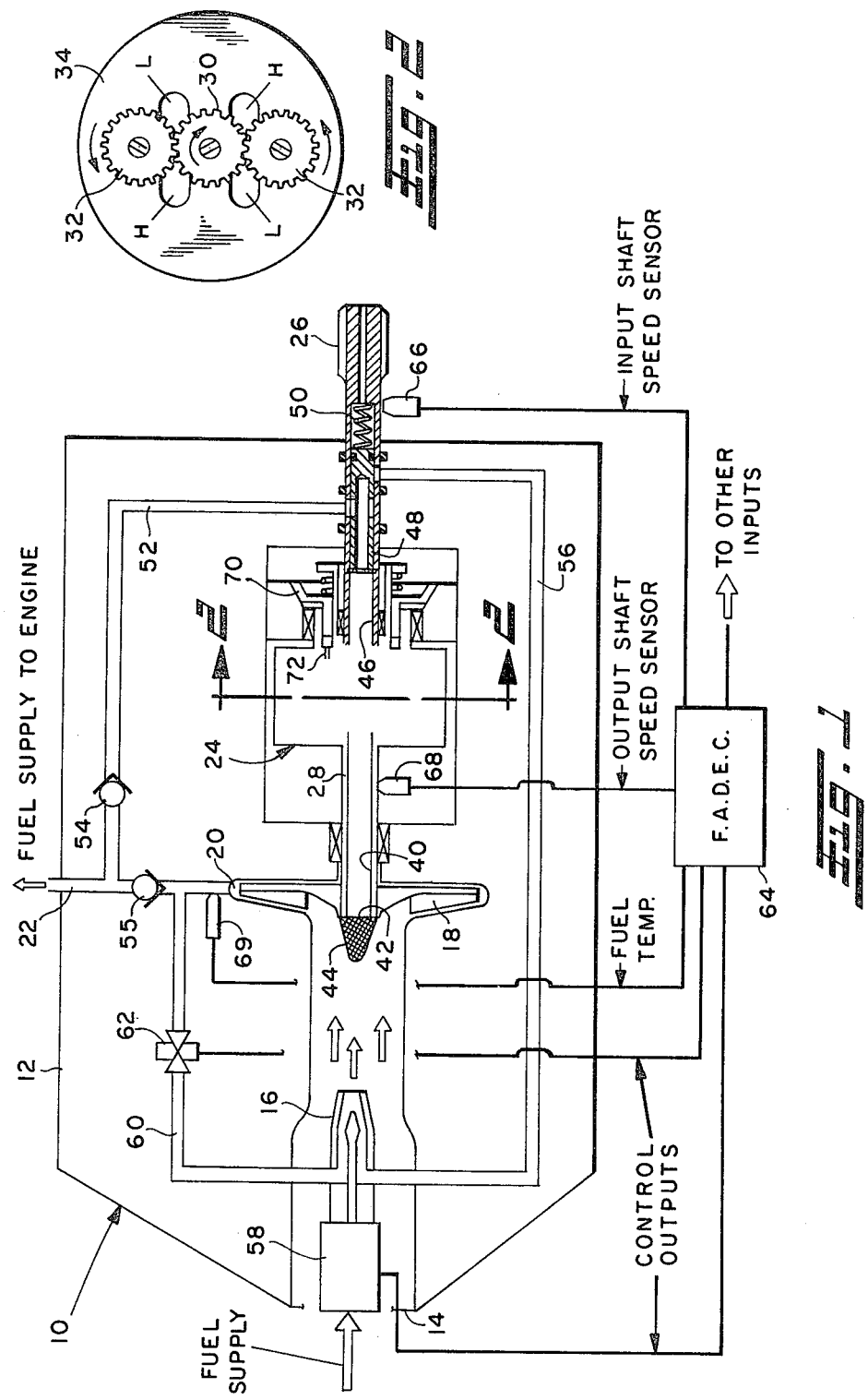

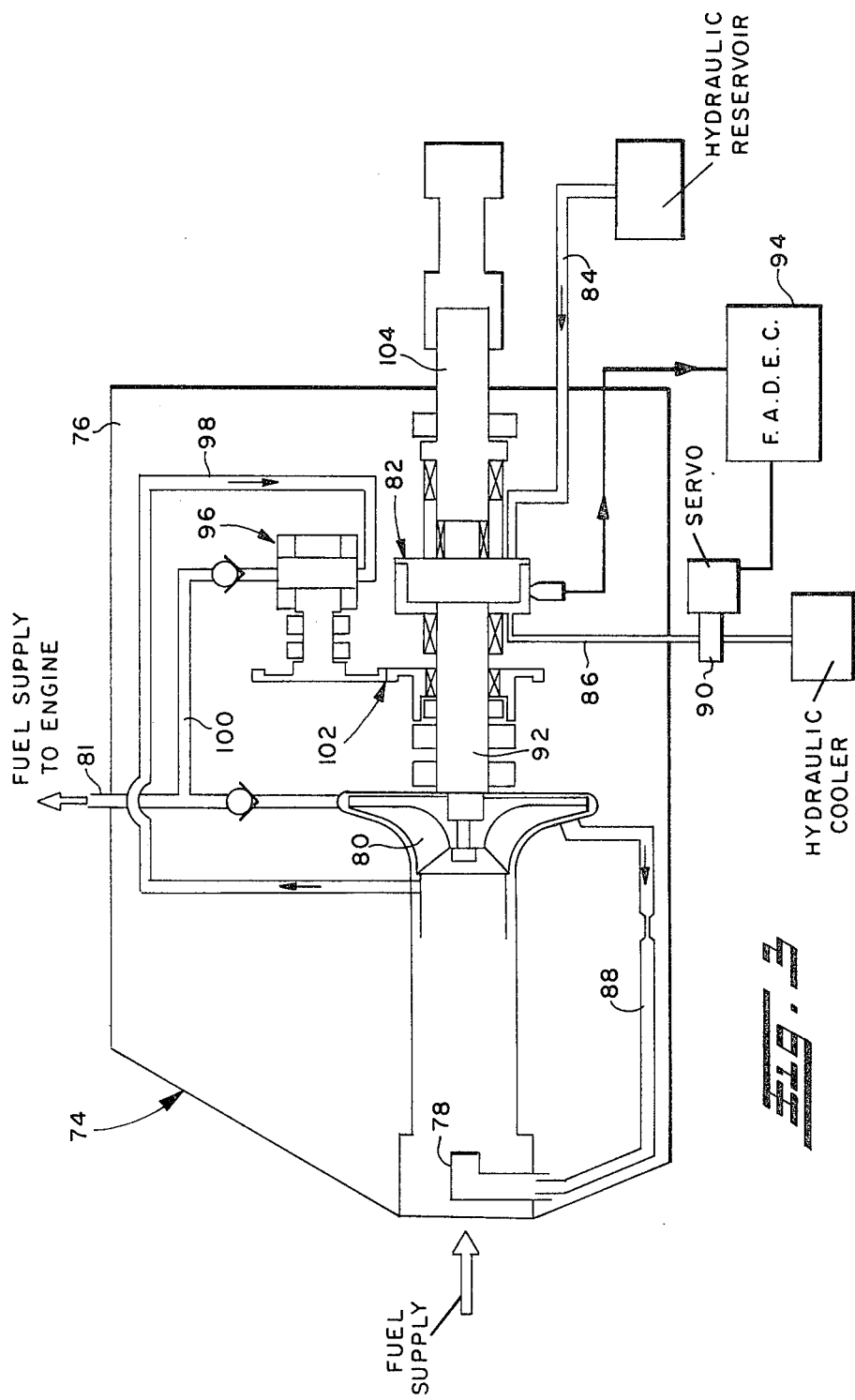

VARIABLE SPEED CENTRIFUGAL PUMP

BACKGROUND OF THE INVENTION

This invention relates generally as indicated to a centrifugal pump especially suited for use in pumping aircraft fuels and the like, and more particularly to a pump employing a variable speed centrifugal impeller stage in combination with a positive displacement pump device for matching fuel flow and pressure to engine requirements throughout a variable flight profile.

In modern aircraft fuel systems, fuel is generally supplied to the engine of the aircraft by an engine-driven fuel pump. Because engine fuel requirements vary under flight conditions, such fuel systems normally require a high flow turn-down ratio of approximately 50:1 for engines without afterburners and 150:1 for engines with afterburners. At flight idle and at high altitudes and high engine speeds, for example, engine fuel flow requirements are relatively low. Without sufficient flow turn-down under such conditions, high input speed to the pump being driven by the engine combined with low fuel flow can cause excessive fuel temperature rise. Since the varying environment in which the aircraft operates may cause the fuel to vary in temperature over a wide range for example from $-65°$ to $+135°$ F. or more, and the temperature rise due to insufficient turn-down may exceed 100° F., the temperature of the fuel being supplied to the engine may exceed 320° F. at which temperature gas turbine burner nozzle coking is known to occur.

Heretofore, various pump designs have employed an engine driven, positive displacement pump within the contaminated fuel region with or without a centrifugal impeller at its first stage. These pumps, however, employ close clearance displacement members that are subject to rapid wear or catastrophic failure with high fuel contamination. To prevent pump failure, usually a filter is provided in the fuel line; however, such filter requires routine service and itself is subject to clogging leading to insufficient fuel flow and thus degraded engine performance. Such pumps further require hydromechanical in-line fuel controls for obtaining high flow turn-down to prevent development of high fuel temperatures. Nevertheless, the fuel temperature delivered to the gas turbine burner nozzle by such type of pump may be sufficiently high to cause coking unless cooled for example by utilizing turbine bleed air but with consequent reduction in gas turbine efficiency.

Centrifugal pumps alone or in combination with jet pumps have also been used in aircraft fuel systems. An example of one such centrifugal pump capable of handling a high ratio of fuel vapor and/or air and liquid fue, termed V/L, greater than 1.0 is shown and described in Davis et al U.S. Pat. No. 4,142,839, granted Mar. 6, 1979. In such centrifugal pumps, fuel discharge output is proportional to input speed resulting in high flow and pressure at high engine speeds. However, under low flow conditions which, for example, occur at high altitudes and high engine speeds, excess pressure may cause high fuel temperatures in excess of 320° F. thereby leading to possible gas turbine burner nozzle coking. Accordingly, suitable in-line fuel controls and metering devices are required to regulate the fuel discharge, and then feed such fuel to a fuel metering device for controlled flow to the fuel nozzles. Moreover, centrifugal pumps by themselves generally cannot develop at low RPM's sufficient fuel flow and pressure to provide for pump prime and engine start-up.

SUMMARY OF THE INVENTION

With the foregoing in mind, it is a principal object of this invention to provide a pump capable of matching fuel flow and pressure to aircraft engine requirements throughout a variable flight profile preferably without requiring use of in-line fuel controls and fuel metering devices.

Another object is to provide such a pump that will operate at high flow turn-down ratios, i.e., at less than 100° F. fuel temperature rise at flight idle or low flow conditions.

Still another object is to provide such a pump which does not require in-line fuel filters or close clearance parts within the contaminated fuel region.

A further object is to provide such a pump which is capable of continuous operation with fuel inlet conditions of fuel true vapor pressure $+2.0$ psi or V/L ratio of 1.00.

Still a further object of the invention is to provide a pump of the type indicated which is capable of providing controlled fuel flow and pressure in response to engine requirements while being capable of delivering sufficient fuel flow and pressure during engine prime and start-up.

These and other objects of this invention may be achieved by providing a pump especially suited for use in pumping aircraft fuels and the like comprising a unique combination of a centrifugal impeller stage and speed control therefor having the capability of matching fuel flow and pressure to engine requirements throughout a variable flight profile. The impeller is controllingly, drivingly, fluidly coupled to the aircraft engine by means of a positive displacement pump device which includes a pair of rotating hydraulic displacing input and output members, one of which is drivingly connected to the impeller and the other adapted for driving connection to the engine. The input and output members are fluidly coupled so that the relative speed of the output member to the input member is variable in response to the discharge fluid flow rate of the positive displacement pump device. Valving responsive to an electronic computer controls the discharge fluid flow rate of the positive displacement pump device to regulate the speed of the impeller. The positive displacement pump device may employ fuel as the pumping media and discharge fuel flow from the positive displacement pump may be directed to the main pump outlet during pump prime and engine start-up, and alternately under normal operating conditions, to a jet nozzle in series with the centrifugal impeller stage to provide motive flow therefor. The high velocity jet is used both to create suction and entrainment of fuel coming from the main pump inlet thereby to break up large incoming vapor bubbles. Preferably free rotation of the impeller in the pump prime and engine start-up mode is restrained by a clutch or the like to ensure adequate fuel supply delivery by the positive displacement pump device to the engine. Such clutch is responsive to positive displacement pump device discharge pressure and will gradually release at a pre-established pressure. Upon clutch release, the impeller will come up to speed established by speed control. Uninterrupted transition of fuel flow and pressure will be provided by virtue of design configuration of the positive displacement pumping device. Design requirements cause it to have approximately three times the required pumping capacity. Therefore, during impeller start up, its output will be regulated by suitable valving. In addition, the clutch will not be released until the input speed is sufficient to allow the impeller to operate the system when two-thirds of the positive displacement pump device flow is lost.

Further in accordance with the invention, filtered fuel is supplied to the positive displacement pump through an inlet proximate the impeller. A wash filter is provided at the inlet and the same is cleansed by fuel passing thereover due to rotary action of the impeller. Accordingly, only filtered fuel is supplied to the positive displacement pump thereby to reduce wear and minimize chances of a catastrophic failure.

In accordance with another form of the invention, the positive displacement pump utilizes, instead of fuel, other hydraulic fluid such as engine lubrication oil or the like for the pumping media. A speed control regulator valve controls discharge oil flow from the positive displacement pump in response to computer control input to regulate the speed of the output member thereof and thus the impeller drivingly connected thereto. During engine prime and start-up, sufficient fuel flow and pressure may be provided by an auxiliary positive displacement prime and start pump which is driven by alternate means such as a battery driven electric motor or by the main positive displacement pump through a speed responsive clutch arrangement which will disconnect gradually the start pump as adequate impeller discharge flow and pressure are achieved.

To the accomplishment of the foregoing and related ends, the invention, then, comprises the features hereinafter fully described and particularly pointed out in the claims, the following description and the annexed drawings setting forth in detail, certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a schematic longitudinal section of a preferred form of centrifugal pump constructed in accordance with this invention;

FIG. 2 is a transverse section through one type of positive displacement pump device according to the invention; and FIG. 3 is a schematic longitudinal section of another form of centrifugal pump constructed in accordance with this invention.

DESCRIPTION OF THE PREFERRED EMBODIMENTS

Referring now in detail to the drawings and initially to FIG. 1 thereof, there is shown a preferred form of pump 10 constructed in accordance with the present invention which generally comprises a pump housing 12 having a main inlet 14, at the left, to which a fuel line (not shown) may be connected to provide for flow of fuel from the fuel tanks of an aircraft to the pump 10. Downstream from the main inlet 14 and suitably housed in the pump housing 12 is a jet pump nozzle 16 in series with a centrifugal pump impeller 18 preferably of the forced vortex impeller design type. The pump housing 12 at its inlet end surrounds the jet pump nozzle 16 and impeller 18 to provide, respectively, an entrainment chamber and shroud therefor. The housing may also have integrally formed therein a volute 20 which receives high pressure discharge flow from the impeller 18 and directs same to a main pump outlet 22. Fuel flow from the main pump outlet 22 is ducted by appropriate means to fuel system components downstream of the pump, or as will be appreciated below, directly to the engine burner nozzle manifold.

The impeller 18 is controllingly, drivingly, hydraulically coupled to the aircraft engine drive by means of a positive displacement pump device 24 which includes co-axially aligned input shaft 26 and output shaft 28, both of which are suitably journaled for rotation in the pump housing 12. The output shaft 28 extends to the left in FIG. 1 into the impeller pumping chamber whereat the impeller may be directly mounted thereon for rotation therewith. The input shaft 26 extends to the right and is adapted at its outer distal end for operable driving connection to the engine drive.

The input shaft 26 and output shaft 28 are fluidly coupled by the positive displacement pump device 24 so that the relative speed of the driven output shaft 28 to the driving input shaft 26 is variable in response to the variable discharge fluid flow rate of the positive displacement pump device 24. With such arrangement, output speed relative to input speed normally will vary from a maximum at full positive displacement pump device flow to a minimum at no positive displacement pump device flow.

In FIG. 2, there is shown schematically one form of positive displacement pump device 24, namely a modified gear-type positive displacement pump including meshed driving gear 30 and driven gears 32. Driving gear 30 is mounted on the input shaft 26 for rotation therewith while driven gears 32 are journaled in casing 34 which is in turn connected to the output shaft 28 for rotation together. The respective axes of the driving and driven gears are preferably in the same plane and the casing 34 is provided with diametrically opposed low pressure inlet ports L and high pressure outlet ports H so that the pump device 24 is dynamically balanced.

It will be appreciated that if the casing 34 is precluded from rotating relative to the pump housing 12, maximum flow output from the positive displacement pump device 24 per input shaft speed will be obtained. It will, however, be appreciated that since the casing 34 normally is freely rotatable in the pump housing 12, the casing 34 will be caused by hydraulic forces to rotate along with the driving gear 30 and input shaft 26 at a relative speed dependent on the discharge flow rate from the pump device. That is, input power from the engine drive to the positive displacement pump device is proportioned between the power required to pump the fuel or other fluid and that required to rotate the casing and thus the impeller 18. Thus it can be seen that the gears and casing therefor thereby define rotating displacing members which are capable of pumping fuel upon relative rotation of same, and further, are capable of transmitting rotary motion from one to the other. It will be appreciated below that by controlling the discharge flow rate from the positive displacement pump device 24, output shaft speed and thus impeller speed can be varied at any given input shaft speed.

The low pressure inlet ports L are in fluid communication with a central passage 40 in the output shaft 28 which has an inlet opening 42 centrally of the hub of impeller 18. A conical wash filter 44 may be provided at the inlet opening 42 which rotates with the output shaft whereby the same is cleansed continuously during operation of the pump by fuel passing thereover. Of course, fuel is drawn through the filter by the positive displacement pump device, and accordingly, only filtered fuel is supplied to the positive displacement pump.

The high pressure outlet ports H are in fluid communication with a central bore 46 in the input shaft 26. Slidably received in the central bore 46 is a valve spool 48 which is normally biased by spring 50 to a first or leftward position for directing discharge flow from the positive displacement pump through discharge port 52 to the main pump outlet 22. A check valve 54 may be provided in the discharge port 52 to prevent reverse flow therethrough when impeller discharge pressure exceeds the discharge pressure of the positive displacement pump device. Similarly, the main pump outlet may be provided with check valve 55 upstream of discharge port 52 to prevent reverse flow through the impeller stage when discharge pressure of the pump device exceeds that of the impeller stage. As discharge pressure of the positive displacement pump device increases, the valve spool is urged to the right in FIG. 1 to a second position directing discharge flow through a second discharge port 56 to jet pump nozzle 16 to provide motive flow therefor.

The jet nozzle 16 may be provided with a variable area motive flow nozzle controller 58 which apportions discharge flow from the positive displacement pump device 24 through the jet nozzle and through outlet port 60 to the main pump outlet 22. Discharge flow through the outlet port 60 may be further controlled by flow control valve 62 connected in-line therewith. If failure of the positive displacement pump device 24 should occur, impeller speed would be 100% engine speed. Engine operation would continue, whereby high pressure discharge flow in the main pump outlet 22 can be controlled to provide motive flow for the jet nozzle and also provide flow to the engine.

During normal operation by control of the nozzle controller 58, output pressure and flow of the positive displacement pump device can be regulated to control the speed of the impeller 18.

Actuation of the nozzle controller 58 and control valve 62 may be regulated by means of an electronic computer 64 through suitable servo-controls. The computer 64 may for example be operatively connected to the engine to sense various engine parameters so that fuel flow and pressure can be matched continuously to engine requirements under variable flight conditions. The computer may further sense pump parameters such as by speed pick-up devices 66 and 68 for detecting respectively input shaft and impeller speed, and temperature sensor 69 for detecting the temperature of the fuel in main pump outlet 22. The computer in response to such parameters sensed will provide initial and integral adjustments to the nozzle controller 58 and control valve 62 for exacting discharge flow and pressure to engine requirements.

During pump prime and engine start-up, discharge flow from the positive displacement pump device 24 is directed by spool valve 48 to the main pump outlet 22 for delivery to the engine burners. However, it will be appreciated that input power to the positive displacement pump device 24 is divided between pumping of fuel and driving of the output shaft 28 which in turn drives the centrifugal pump impeller 18. To ensure adequate fuel flow the the main pump outlet 22 at low engine RPM's, the output shaft 28 may be restrained from free rotation, for example, by means of a spring-loaded cone clutch assembly 70. The clutch assembly 70 may be referenced through suitable porting 72 to the positive displacement pump device so that same will gradually release as the rotational speed approaches that required to operate the engine. Thus, the clutch assembly in effect acts as a brake restraining free rotation of the output shaft 28 until the fluid pressure acting on the clutch assembly moves it out of engagement with the pump casing. After this speed is reached, the clutch assembly will be fully disengaged thus permitting free rotation of the output shaft. The clutch assembly during such transition provides an uninterrupted transition of flow and pressure through the main pump outlet 22, such outlet flow initially being provided primarily by the positive displacement pump device and then by the impeller.

After start-up is complete, discharge pressure from the positive displacement pump device 24 will have shifted valve spool 48 to its second or rightward position to direct such discharge flow to the jet nozzle 16 to provide motive flow therefor. Since the output shaft 28 is driven against the torque imparted to the impeller 18 by fuel flow, fluid pressure will be developed by the positive displacement pump device to supply sufficient motive flow for the jet pump nozzle.

Referring now to FIG. 3, another form of pump according to the invention is designated generally by reference numeral 74. The pump 74 generally is of similar construction to that shown in FIG. 1 and includes pump housing 76 in which are suitably housed jet pump nozzle 78 and centrifugal impeller 80 which discharge high pressure fuel to main pump outlet 81. As an example of one type of jet pump and centrifugal pump design that may be used, reference may be had to Davis et al U.S. Pat. No. 4,142,839.

The impeller 80 is controllingly, drivingly coupled to the aircraft engine drive by means of positive displacement pump device 82 like that described above except that the positive displacement pump device 82 may utilize engine lubrication oil or the like as the pumping media. Such oil may be supplied to the inlet of the positive displacement pump device 82 through inlet conduit 84 connected preferably to the downstream side of the main lube oil filter of the engine lubrication system while discharge flow of the positive displacement pump device is directed through discharge conduit 86 preferably to the engine lubrication system oil cooler inlet. It will of course be understood that suitable seals will be required in the pump housing to prevent intermixing of fuel and lubrication oil.

Since the positive displacement pump device 82 no longer supplies the motive flow for jet pump nozzle 78, a suitable tap 88 may be provided in communication with high pressure discharge flow from the impeller 80 for providing such motive flow.

Discharge flow through the positive displacement pump device 82 may be regulated by a speed control regulator valve 90 positioned in-line with the pump discharge conduit 86. As the oil is returned solely to the lubrication system, the valve 90 functions only to block or restrict discharge flow therethrough thereby to vary the speed of output shaft 92 of the positive displacement pump device 82 and thus the speed of impeller 80 which is mounted on the output shaft for rotation therewith. During normal operating conditions, a computer 94 which senses engine and pump parameters may be used to control the valve 90 to match impeller discharge flow and pressure to engine requirements.

For pump prime and engine start-up, the pump 74 preferably is provided with an auxiliary positive displacement start pump 96 which receives fuel through inlet conduit 98 and pumps same through outlet conduit 100 to main pump outlet 81. Such auxiliary positive displacement start pump 96 may be driven by suitable means such as by a battery powered motor, but is preferably driven by the output shaft 92 through a centrifugal clutch and gear arrangement 102 as shown. The centrifugal clutch and gear arrangement 102 will deactivate the start pump 96 as adequate impeller speed is achieved to ensure sufficient discharge flow and pressure through main pump outlet 81. It should be noted that during start-up, the output shaft 92 can be locked to the input shaft 104 by blocking discharge flow from the positive displacement pump device 82.

From the foregoing, it will be apparent that the present invention provides a variable speed centrifugal pump for aircraft fuel systems having the capability of matching fuel flow and pressure to engine requirements throughout a variable flight profile. Accordingly, pump discharge flow may be directed to the engine burners of the aircraft without in-line flow controls and metering devices. Moreover, the pump of the invention is capable of delivering sufficient fuel flow and pressure during pump prime and engine start-up and is capable of handling incoming fuels having a high V/L ratio under in-flight conditions.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. A variable speed, variable output pump for an aircraft fuel system comprising a housing having a main inlet and a main outlet, a jet pump nozzle downstream of said main inlet, an impeller downstream of said jet nozzle and in fluid series therewith, positive displacement pump means for controllingly, drivingly connecting said impeller to the aircraft engine, the speed of said impeller relative to engine speed being variable in response to the discharge flow rate of said pump means, and valve means for controlling the discharge flow rate of said pump means thereby to vary impeller speed relative to the engine speed and for directing discharge flow of said pump means to said main outlet and to said jet nozzle to provide motive flow therefor.

2. A pump for an aircraft fuel system comprising a centrifugal impeller stage, fluid coupling means for controllingly, drivingly connecting said impeller stage to the engine of the aircraft to facilitate matching of fuel flow and pressure to engine requirements, said fluid coupling means comprising rotating input and output members, and positive displacement pump means for fluidly coupling said input and output members, the relative speed of said output member to said input member being variable in response to the discharge flow rate of said pump means, valve means for controlling the discharge flow rate of said pump means thereby fluidly to vary the relative speed of said output member to said input member, an electronic computer operatively connected to the engine to sense various engine parameters, and means operatively connecting said valve means to said computer so as to be controlled in accordance with the parameters sensed thereby to control the speed of the centrifugal impeller stage to match fuel flow and pressure to engine requirements.

3. A pump for an aircraft fuel system comprising a centrifugal impeller stage, fluid coupling means for controllingly, drivingly connecting said impeller stage to the engine of the aircraft to facilitate matching of fuel flow and pressure to engine requirements, said fluid coupling means comprising rotating input and output members, and positive displacement pump means for fluidly coupling said input and output members, the relative speed of said output member to said input member being variable in response to the discharge flow rate of said pump means, valve means for controlling the discharge flow rate of said pump means thereby fluidly to vary the relative speed of said output member to said input member, a main inlet and outlet for said pump for respectively receiving and discharging fuel, means for directing a portion of the fuel to said positive displacement pump means for use as its pumping media, and a jet pump stage in series with said impeller stage, said valve means being operative to direct discharge flow from said pump means to said jet pump stage to provide the motive force therefor.

4. The pump of claim 3 wherein said valve means is operative to direct the discharge flow of said pump means to said main outlet during engine start-up and to said jet pump during normal operating conditions.

5. The pump of claim 4 wherein said input member comprises an input shaft adapted for driving connection to the engine and said output member comprises an output shaft, and the impeller of said impeller stage is mounted on said output shaft for rotation therewith.

6. The pump of claim 5 further comprising means to restrain free rotation of said output shaft during engine start-up.

7. The pump of claim 6 wherein said means to restrain further comprises means for gradually releasing said output shaft as impeller discharge pressure rises.

8. The pump of claim 7 wherein said means to restrain comprises a cone-clutch responsive to positive displacement device discharge pressure.

9. A pump for an aircraft fuel system comprising a centrifugal impeller stage, fluid coupling means for controllingly, drivingly connecting said impeller stage to the engine of the aircraft to facilitate matching of fuel flow and pressure to engine requirements, said fluid coupling means comprising rotating input and output members, and positive displacement pump means for fluidly coupling said input and output members, the relative speed of said output member to said input member being variable in response to the discharge flow rate of said pump means, valve means for controlling the discharge flow rate of said pump means thereby fluidly to vary the relative speed of said output member to said input member, a positive displacement start-up pump in parallel with said impeller stage, and means for operatively driving said start-up pump during engine start-up and for disengaging said start-up pump after start-up is achieved, said means for operatively driving comprising a centrifugal clutch connected to said output shaft.

10. In combination, an aircraft engine and a fuel pump therefor, said fuel pump including a centrifugal impeller stage for pumping fuel to said engine, fluid coupling means for controllingly, drivingly connecting said impeller stage to said engine to permit fuel flow and pressure to be matched to engine requirements, said fluid coupling means comprising rotating input and output shafts drivingly connected, respectively, to said engine and said centrifugal impeller stage, positive displacement pump means for fluidly coupling said input and output shafts, the relative speed of said output shaft to said input shaft being variable in response to the discharge flow rate of said pump means, barrier valve means for controllingly blocking discharge flow from said pump means thereby hydraulically to vary the relative speed of said output shaft to said input shaft, computer means operatively connected to the engine to sense various engine parameters, and means operatively connecting said valve means to said computer means so as to be controlled in accordance with the parameters sensed thereby to control the speed of the centrifugal impeller stage to match fuel flow and pressure to engine requirements.

11. The combination of claim 10 further comprising a main inlet and outlet for said pump for respectively receiving and discharging fuel, said pump means using the fuel as its pumping media.

12. The combination of claim 11 further comprising a jet pump stage in series with said impeller stage, said valve means being operative to direct discharge flow of said pump means to said jet pump stage to provide the motive force therefor and to said main outlet.

13. The combination of claim 12 wherein said discharge flow of said pump means is directed to said main outlet during engine start-up and to said jet pump during normal operating conditions.

14. The combination of claim 13 further comprising means to restrain free rotation of said output shaft during engine start-up.

15. A pump for an aircraft fuel system comprising a centrifugal impeller stage, fluid coupling means for controllingly, drivingly connecting said impeller stage to the engine of the aircraft to facilitate matching of fuel flow and pressure to engine requirements, said fluid coupling means comprising rotating input and output members, and positive displacement pump means for fluidly coupling said input and output members, said centrifugal impeller stage being directly driven by said output member, said positive displacement pump means including means for varying the relative speed of said output member to said input member in response to changes in the discharge flow rate of said pump means, and valve means for controlling the discharge flow rate of said pump means thereby fluidly to vary the relative speed of said output member to said input member.

16. The pump of claim 15 further comprising means for sensing various engine parameters and controlling said valve means in accordance with the parameters sensed thereby to control the speed of the centrifugal impeller stage to match fuel flow and pressure to engine requirements.

17. The pump of claim 16 further comprising a main inlet and outlet for said pump for respectively receiving and discharging fuel, and means for directing a portion of the fuel to said positive displacement pump means for use as its pumping media.

18. The pump of claim 15 wherein the impeller of said impeller stage is mounted on said output member for rotation therewith.

19. The pump of claim 18 wherein said output member has a central passage providing an inlet to said pump means proximate the impeller of said impeller stage, and filter means in said inlet for filtering the fuel received therethrough, said filter means being so positioned in said inlet so as to be cleansed by fuel passing thereover.

20. The pump of claim 15 further comprising means to restrain free rotation of said output member during engine start-up, said means being operative to gradually release said output member as impeller discharge pressure rises.

21. The pump of claim 20 wherein said means to restrain comprises a clutch responsive to positive displacement pump discharge pressure.

22. The pump of claim 15 further comprising a positive displacement start-up pump in parallel with said impeller stage, and means for operatively driving said start-up pump during engine start-up and for disengaging said start-up pump after start-up is achieved.

23. The pump of claim 15 wherein said pump means comprises a gear-type positive displacement pump, said gear-type positive displacement pump including a driving gear connected to said input shaft and a driven gear carried by a rotatable casing, said output shaft being connected to said casing for rotation therewith.

24. In combination, an aircraft engine and a fuel pump therefor, said fuel pump including a centrifugal impeller stage for pumping fluid to said engine, fluid coupling means for controllingly, drivingly connecting said impeller stage to said engine to permit fuel flow and pressure to be matched to engine requirements, and means for sensing various engine parameters and controlling said fluid coupling means in accordance with the parameters sensed thereby through a variable flight profile to control the speed of the centrifugal impeller stage to match fuel flow and pressure to engine requirements throughout such variable flight profile.

* * * * *